United States Patent [19]

Packham

[11] Patent Number: 5,063,999

[45] Date of Patent: Nov. 12, 1991

[54] MOLDBOARD PLOW APPARATUS FOR SWITCHING SOIL STRIPS FROM ONE FURROW TO ANOTHER

[76] Inventor: Lester M. Packham, 3932 Christmas Tree La., Bakersfield, Calif. 93306

[21] Appl. No.: 639,038

[22] Filed: Dec. 31, 1990

[51] Int. Cl.[5] .................... A01B 79/00; A01B 15/02; A01B 23/04

[52] U.S. Cl. .................................... 172/1; 172/754; 172/757; 172/686; 172/721

[58] Field of Search .............. 172/754, 757, 759, 1, 172/720, 721, 722, 723, 730, 686; 37/269, 272

[56] References Cited

U.S. PATENT DOCUMENTS 3,799,273  3/1974  Despretz ........................ 172/754

FOREIGN PATENT DOCUMENTS

| 640689 | 1/1979 | U.S.S.R. | 172/1 |
| 913955 | 3/1982 | U.S.S.R. | 172/754 |
| 1029838 | 7/1983 | U.S.S.R. | 172/754 |
| 1083930 | 4/1984 | U.S.S.R. | 172/754 |
| 1149888 | 4/1985 | U.S.S.R. | 172/721 |
| 1166674 | 7/1985 | U.S.S.R. | 172/759 |
| 2016553 | 9/1979 | United Kingdom | 172/686 |
| 2199722 | 7/1988 | United Kingdom | 172/754 |

Primary Examiner—Dennis L. Taylor
Assistant Examiner—Spencer Warnick
Attorney, Agent, or Firm—Robert J. Schaap

[57] ABSTRACT

A moldboard plow apparatus having alternate and co-operating moldboards or so-called "scoops". The first of the moldboards digs out and lifts a first soil section from a ground surface thereby forming a first furrow or so-called "cut". The second moldboard or so-called "scoop" cuts and lifts a second soil section thereby forming a second furrow, parallel to and usually adjacent to the first furrow. The moldboards are shaped such that a rearward movement of the soil sections on the respective moldboards causes the soil sections to be inverted and thrown from the moldboards into the opposite furrow in an upside-down condition. Thus the first soil section is thrown into the section furrow and the second soil section is thrown into the first furrow.

21 Claims, 5 Drawing Sheets

MOLDBOARD PLOW APPARATUS FOR SWITCHING SOIL STRIPS FROM ONE FURROW TO ANOTHER

BACKGROUND OF THE INVENTION

1. Field of the Invention

This invention relates in general to certain new and useful improvements in a moldboard plow apparatus, and more particularly, to a moldboard plow apparatus which is capable of simultaneously inverting a pair of opposite soil sections and throwing an depositing the soil sections in an inverted condition and in furrows from which the other of the soil sections were removed.

2. Brief Description of the Prior Art

In the growing of most plant products, plowing is a necessary and integral operation. The reasons for the plowing and the seasonal times in which plowing is conducted may vary from one farming operation to another. However, one of the principal reasons for plowing is to bury ground stubble and/or undesirable plants after a crop has been harvested and to insure that no undesirable growth, such as weed growth is still present on the surface, so that the surface may be prepared for the planting of a new crop.

Moldboard plows have been used for centuries in various forms. A few of the early moldboard plows are described in U.S. Pat. No. 1,320 to Barnaby and in U.S. Pat. No. 114,044 to L. P. Rider. The conventional moldboard plow, as used in early times and as presently used, shears a strip of soil from the ground and then inverts it by rolling it over in a manner somewhat similar to the turning of a page in a book. The moldboards also cause a displacement of the removed strip of soil by a distance approximately equal to one furrow width. In this type of plowing operation, fresh soil is exposed on the upper surface of the inverted strip of soil and weeds and stubble are buried under the deposited strip of soil.

This type of soil movement necessarily causes the first strip of soil to be deposited on previously unplowed soil and also causes the opening of a furrow or channel in the ground surface. In farm terminology, this operation is described as the first strip of soil "being thrown onto the land". The second and subsequent plowed strips of soil are also thrown into the open furrows made by the previous plows. As a simple example, if a strip of soil is removed, it may be thrown into the furrow to its immediate left. The next strip of soil is then also thrown into the furrow to its left and so forth. Thus, it can be observed that during the plowing operation, the plowed soil surface is moved one furrow width in the same direction of throw each time a soil strip is turned over. Moreover, when the plowing operation has been completed, the last furrow (an open furrow) is left unfilled and in addition, one soil strip, (the first plowed strip) is left deposited on the unplowed land leaving a ridge.

In accordance with the above identified plowing arrangement, it can be seen that if plowing began and ended at the same place each time the field was plowed, the plowed upper surface would be moved in a single direction and eventually, a hill would build up at the starting strip and a trench would develop at the ending furrow.

In essentially all commercially available moldboard plows, the construction is such that the soil strip is turned over in one direction only. In other words, essentially all of the present commercially available moldboard plows form furrows and move the soil either to the right or to the left, but always in that same direction. Accordingly, when plowing a large field, it is necessary to divide the field into an acceptable series of geometric shapes for plowing so that time consuming long runs at the end of the field are minimized. In accordance with this type of plowing operation, one geometric shape of land is plowed, the next geometric shape is then subsequently plowed and so forth.

Multiple plows may be mounted on a single frame which make it possible to limit the number of traverses across a particular field. However, this construction does not solve the problem of throwing the soil strips removed from the land in only one direction. Accordingly, there is still lost time in the plowing operation.

The construction of mounting a large number of plows on a frame necessarily causes a staggering of the positioning of the plows on the frame. This increases the overall length of the plow assembly. As a result, turning around at the end of each row requires much more space. As a further result, less land is available for the growing of crops Inasmuch as the commercially available moldboard plows only throw soil in one direction, the plow has a resultant large reaction force which tends to force the plowshares laterally away from the direction of throw. This inherently creates a large amount of frictional force which tends to resist the movement of the plowshares. The friction generated by this force can result in as much as 50 percent of the total pulling force required for the moving of the plowshares. See for example, Richey, C.B., et al., *Agricultural Engineers Handbook*, McGraw-Hill Book Co., Inc., New York, 1961, pp. 130–131.

In an attempt to decrease the large frictional forces generated, a so-called "landslide", which is customarily a piece of metal strip, is mounted on the frame of the plow and slides along the inside of a wall of the opened furrow. Some moldboard plow apparatus have been equipped with rollers in order to decrease the frictional forces which are generated. However, because of other difficulties which may arise, the rollers are less desirable than the use of the landslide. In either case, the rollers or the landslide add additional weight to and also increases the cost of construction of the moldboard plow.

In order to overcome some of the problems in the presently available multiple plow constructions, there has been the introduction of the so-called "roll-over" multiple plow. This type of plow apparatus includes two sets of plows which are mounted to a rotating beam or shaft on the frame of the plow apparatus. The plows on each of the two sets have opposite throws, that is they direct the soil strips in opposite directions. The plows are mounted on the shaft 180 degrees apart with one set disposed in an upside down condition while the other set is plowing. In accordance with this construction, one set of plows is used to plow in one direction across the field. At the end of the plowing of a strip, the plows are lifted from the ground and the shaft retaining the plows is rotated 180 degrees about its axis such that the plowing apparatus is turned around for the return trip across the field. The opposite set of plows are lowered into the soil for forming a furrow therein, and plowing is continued with the soil strips still being thrown in the same direction relative to the ground's surface.

In accordance with the above identified plowing operations performed with roll-over flows, they are necessarily required to have twice as many moldboards mounted on the frame as the number of furrows to be plowed. This construction results in a great increase in weight, not only because of the number of moldboards, but because of the massive framework required to support the roll-over mechanism. Accordingly, the roll-over plow retains the undesirable characteristics of high land side friction, excessive length and unidirectional soil movement.

There has been a need for a moldboard plow which is capable of minimizing the frictional losses which are inherent in most of the presently available moldboard plow constructions. In addition, there has been a need for a moldboard plow which can minimize the frictional losses without excessive length and without the redundancy of moldboards to perform the plowing operation. Such a plow construction must not be massive with a substantial amount of excess weight for each plow, or otherwise a greater amount of power is required for moving of the plow apparatus. Finally, there has been a need for a moldboard plow apparatus which does not throw and leave a soil strip on the land and which does not leave an open furrow.

OBJECTS OF THE INVENTION

It is, therefore, one of the primary objects of the present invention to provide a moldboard plow apparatus which is capable of simultaneously removing a pair of soil strips from a ground surface and forming a pair of furrows &herein with a depositing of the removed soil strips in the opposite furrows.

It is another object of the present invention to provide a moldboard plow apparatus of the type stated in which the soil strips are also inverted when they are thrown into the opposite furrow.

It is a further object of the present invention to provide a moldboard plow apparatus of the type stated in which the frictional force resulting from the movement of the plow are relatively low compared to standard moldboard plows.

It is also an object of the present invention to provide a moldboard plow apparatus of the type stated in which turnaround time is minimal and which does not require an increase in the overall length of the assembly for inverting the soil strips.

It is an additional object of the present invention to provide a moldboard plow apparatus of the type stated utilizing a pair of cooperating moldboard plows and in which a pair of soil strips are inverted and are thrown into opposite furrows.

It is still another object of the present invention to provide a moldboard plow apparatus of the type stated which does not leave a soil strip thrown up on the land or leave an open furrow.

It is still a further object of this invention to provide a moldboard plow of the type stated which eliminates the cumulative side loads in one direction by having equal and oppositely directed side loads.

It is a salient object of the present invention to provide a method for plowing a ground surface and forming spaced apart first and second furrows and sequentially depositing the soil strips removed from the ground into the opposite ones of the furrows.

With the above and other objects in view, my invention resides in the novel features of form, construction, arrangement and combination of parts presently described and pointed out in the claims.

BRIEF SUMMARY OF THE INVENTION

A moldboard plow apparatus for creating a pair of furrows and shifting a soil strip removed from one furrow to the other. Thus, a pair of soil strips are essentially sequentially removed from a ground surface and the soil strip removed from one furrow is thrown into the opposite furrow with the soil removed from that opposite furrow thrown into the first named furrow.

The moldboard plow apparatus comprises a first moldboard plow for removing and elevating a first soil strip from the ground surface thereby forming a first furrow. The moldboard plow apparatus comprises a second plow for removing a second soil strip from the ground surface and introducing it into the first furrow and also thereby forming a second furrow therein. In like manner, the first moldboard plow has a section which causes the first soil strip to be introduced into the second furrow. In a preferred embodiment of the present invention, the section on each of the moldboard plows which causes the soil strips to be introduced into the opposite furrows also causes the soil strips to be inverted. Preferably, the inversion of the soil strips occur approximately simultaneously with the throwing of the soil strips into the opposite ones of the furrows.

The first moldboard plow has an elevated portion which raises the first soil strip above the level of the second soil strip. This latter portion will retain the first soil strip in an elevated position while the second soil strip is being removed from the ground surface. The second moldboard plow also inverts the second soil strip and deposits it into the open furrow located under the first soil strip while that first soil strip is still in an elevated position. Thereafter, the first soil strip is inverted an deposited into the second furrow. Each of the moldboards have a plow share with a forward edge capable of shearing free a strip of soil and raising the soil strip as the moldboard plow is moved forwardly. In a more preferred embodiment, the forward edge of the first moldboard is located forwardly of the forward edge of the second moldboard.

Each of the moldboards has a surface which curves generally continuously rearwardly from the forward edge of the share and also in the direction of the furrow formed by the opposite moldboard. This surface of each said moldboards also generally continuously increases in elevation rearwardly from the forward edge.

In a more preferred embodiment of the present invention, the plow apparatus comprises a first pair of cooperating moldboard plows on one side including the first and second of the moldboard plows and a second pair of cooperating moldboard plows on the opposite side. The second pair also includes a first moldboard plow and a second moldboard plow. In this way, two pairs of furrows are capable of being formed with the soil strips of one furrow being thrown into the opposite furrow of that pair and the soil strip of the second pair being thrown into the opposite furrow of that second pair.

In still a more preferred embodiment, the first moldboard plow is mounted on the frame and has a share at the forward end which is comprised of the forwardly projecting shearing edge capable of digging into the ground surface to form a furrow. This first moldboard has a first moldboard surface extending rearwardly from the forwardly projecting edge and may be curved generally continuously toward one lateral side of the frame from a point spaced rearwardly of the projecting edge to a rear edge of this first moldboard plow. The first moldboard surface is also continuously curved sufficiently toward one lateral side so that a rear section of the moldboard surface presents the surface generally downwardly and to one lateral side of the frame so that a soil strip thereon may be inverted and deposited into another furrow.

The second moldboard is also mounted on the frame and is comprised of a share having the forwardly projecting second shearing edge capable of digging into the ground surface to form a second furrow and also lifting a second soil strip therefrom. The surface on this second moldboard, namely the second moldboard surface, extends rearwardly from the forwardly projecting edge and is curved generally continuously toward an opposite lateral side of the frame from a point spaced rearwardly from the second projecting edge to a rear edge of this second moldboard plow. The second moldboard surface is also continuously curved sufficiently toward the opposite lateral side s that a rear section of the second moldboard surface presents the second surface generally downwardly and to the opposite lateral side of the frame. In this way, the second soil strip thereon may be inverted and deposited in the first of the furrows.

As indicated previously, the first and second moldboard surfaces also incline generally upwardly as they extend rearwardly. Moreover, the rear section of the first moldboard surface is elevated above the rear section of the second moldboard surface.

The present invention also provides a second embodiment of the moldboard plow apparatus, which is similar to the first described embodiment, but which includes a type of paddle wheel for moving the soil strips along the respective moldboard plow. This paddle wheel is comprised of a wheel having a plurality of blades for engaging and moving the soil on the respective moldboard plows. The paddle wheel is hingedly mounted so that it can be hingedly raised somewhat and lowered by the force of gravity to accommodate the thickness of the soil strip. Further, the paddle wheel may be powered for rotation as for example, by a hydraulic motor which may be connected to the hydraulic lines of the tractor pulling the plow.

The present invention also provides a method of plowing a ground surface and simultaneously forming adjacent first and second furrows. The method involves the depositing of the soil strips removed from the ground surface into the opposite ones of the furrows thus formed.

The present invention has many other objects and advantages which will become more fully apparent from a consideration of the forms in which it may be embodied. These forms are illustrated in the accompanying drawings and described in more detail in the detailed description of this invention. However, it is to be understood that such detailed description is only for the purpose of illustrating the general principles of the invention and is not to be taken in a limiting sense.

BRIEF DESCRIPTION OF THE DRAWINGS

Figure 1:
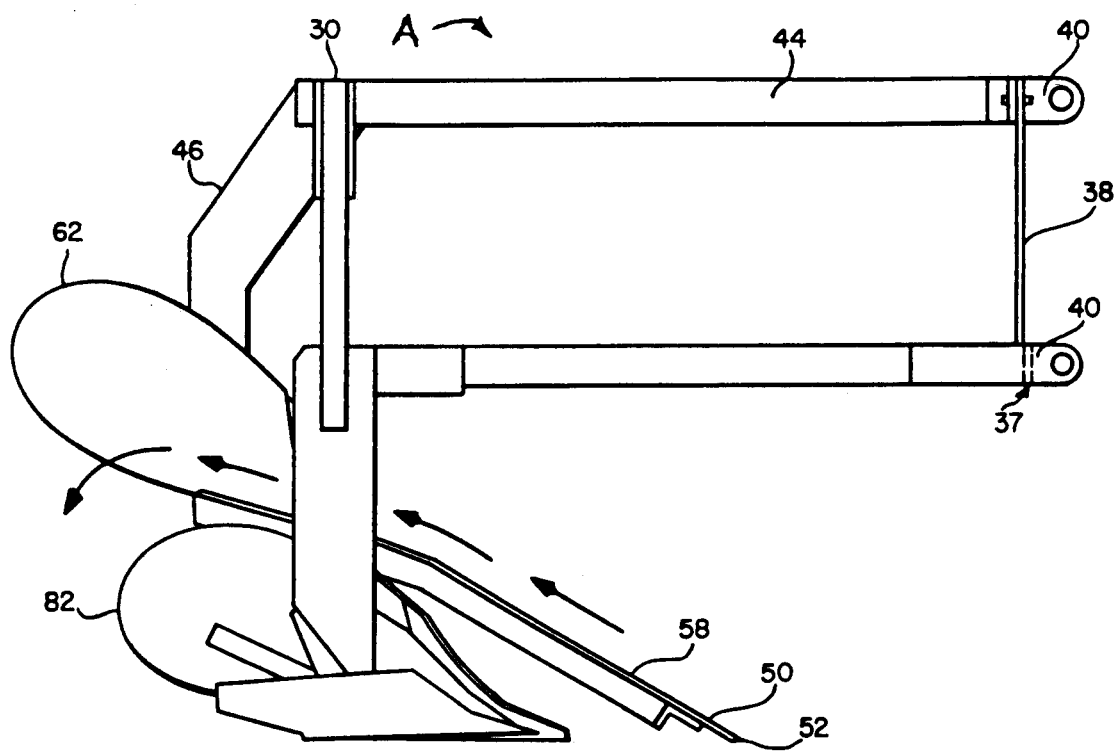
Figure 2:
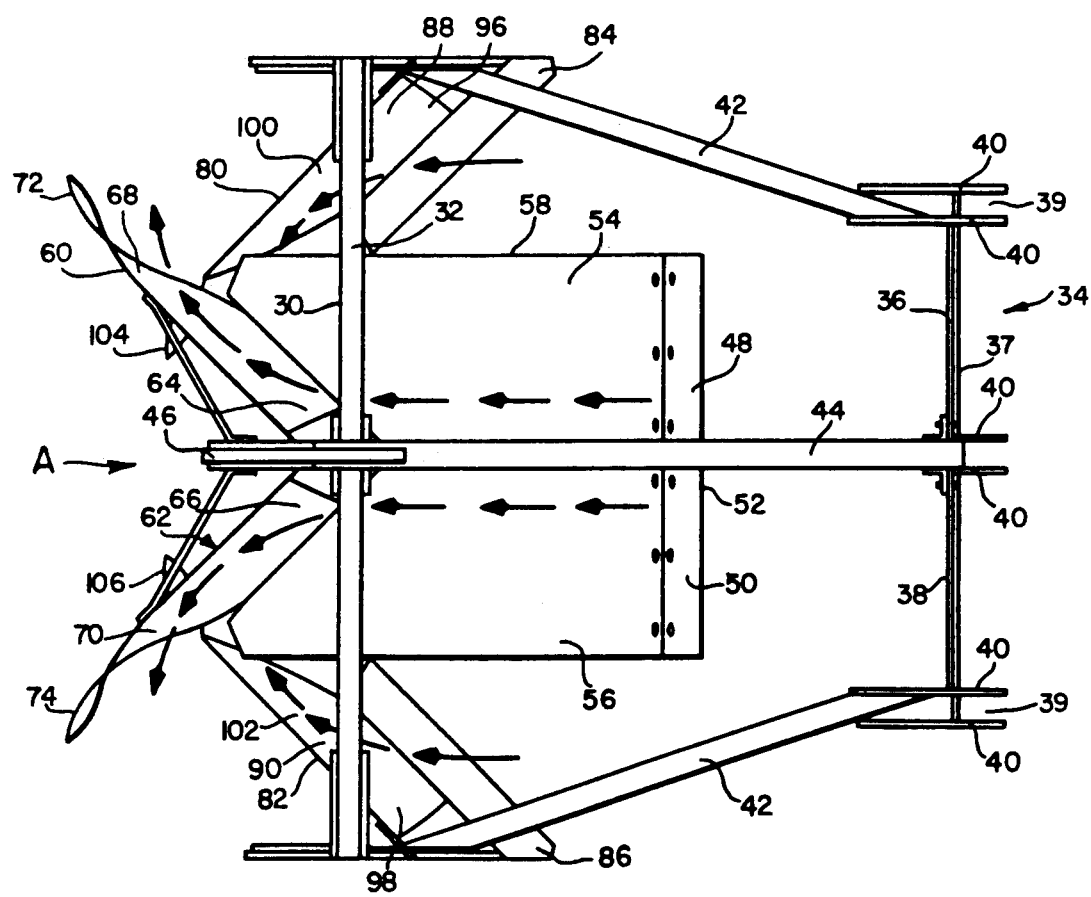
Figure 3:
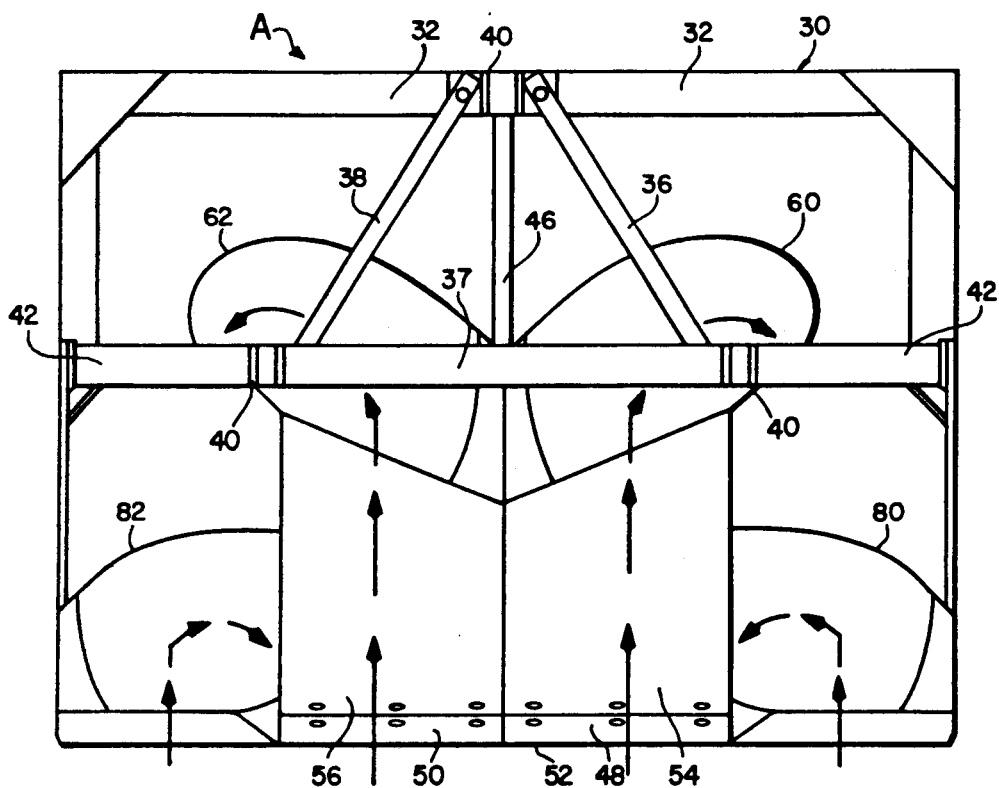
Figure 6:
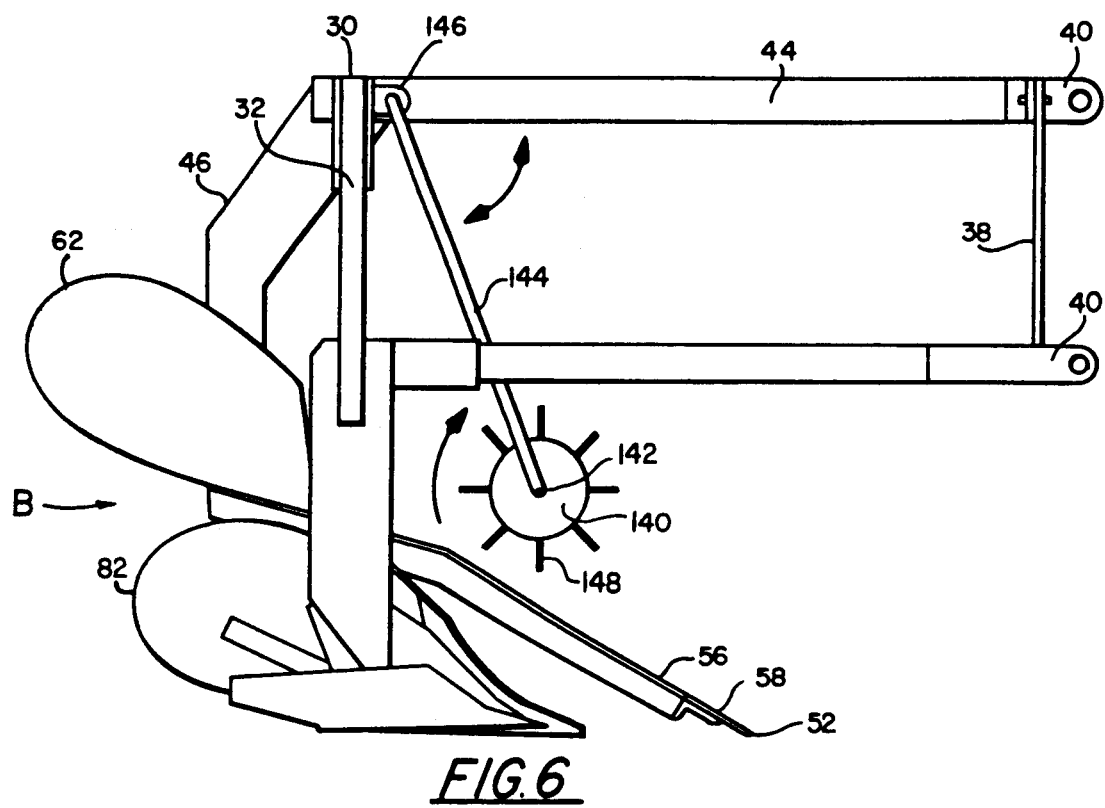
Figure 7:
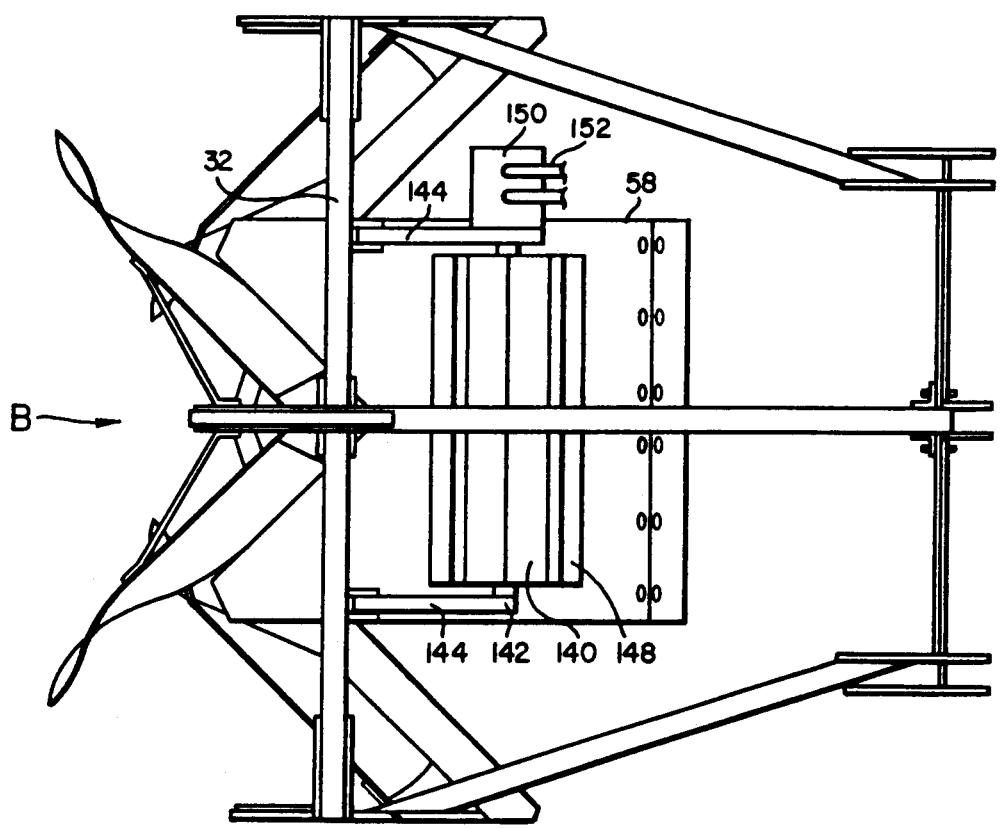
Figure 8:
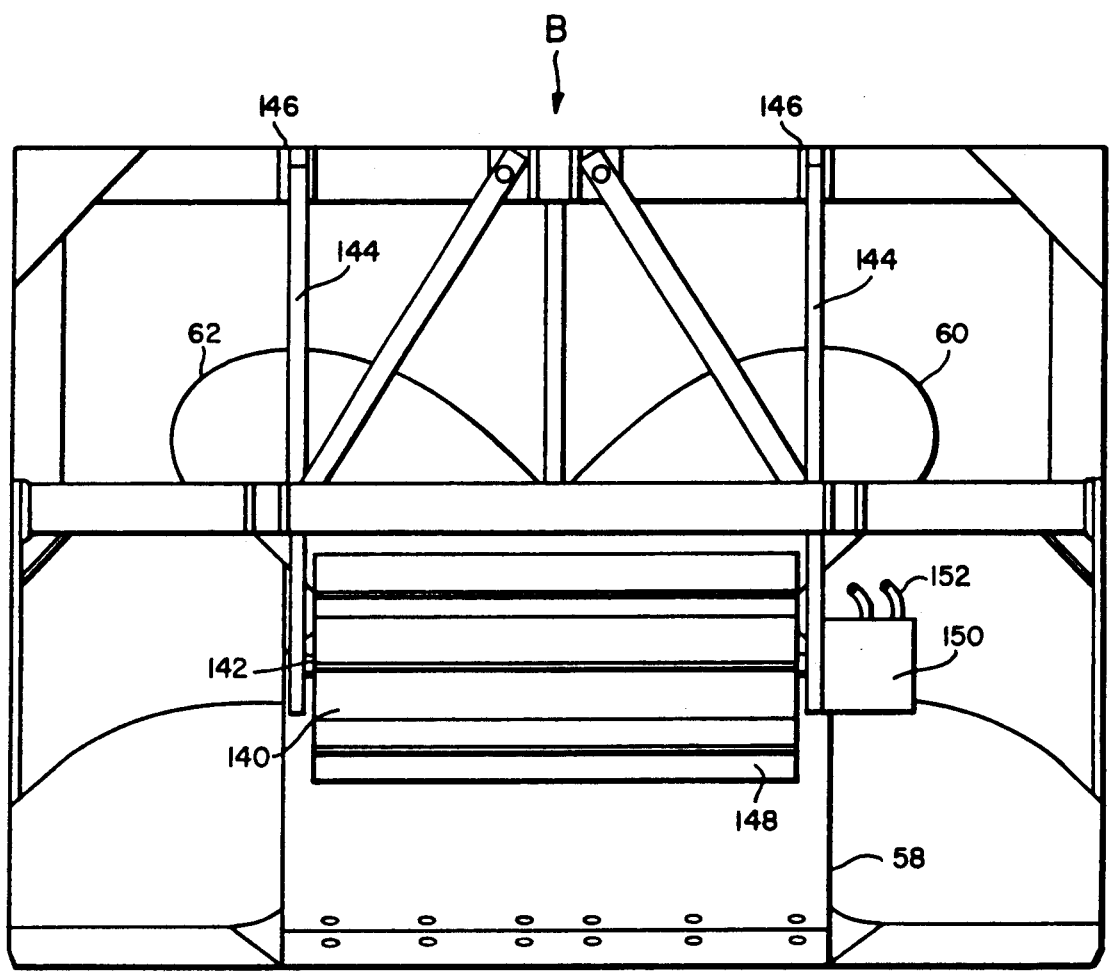

Having thus described the invention in general terms, reference will now be made to the accompanying drawings in which:

FIG. 1 is a side-elevational view of a moldboard plow apparatus constructed in accordance with and embodying the present invention;

FIG. 2 is a top plan view of the moldboard plow apparatus of FIG. 1;

FIG. 3 is a front elevational view of the moldboard plow apparatus of FIGS. 1 and 2;

FIGS. 4A through 4H are a series of schematic views illustrating the method involved in the use of the moldboard plow apparatus of the present invention;

FIGS. 5A through 5F are a series of schematic views illustrating the method involved in the use of the moldboard plow apparatus with the embodiment as illustrated in FIGS. 1 through 3;

FIG. 6 is a side elevational view of a modified form of moldboard plow apparatus constructed in accordance with and embodying the present invention;

FIG. 7 is a top plan view of the modified form of moldboard plow apparatus of FIG. 6; and FIG. 8 is a front elevational view of the modified form of moldboard plow apparatus of FIGS. 6 and 7.

DETAILED DESCRIPTION OF A PREFERRED EMBODIMENT

Referring now in more detail and by reference characters to the drawings which illustrate a preferred embodiment of the present invention, there is illustrated and described an embodiment of a moldboard plow which is constructed in accordance with and embodies the present invention. The moldboard plow, as illustrated in FIGS. 1-3, in the preferred embodiment, comprises a pair of plows for creating a first furrow and a second furrow and a spaced apart second pair of plows for creating a second pair of furrows including a third furrow and a fourth furrow, as hereinafter described in more detail. However, it should be understood that the plow apparatus could be constructed with only two moldboard plows.

In order to more fully appreciate the present invention, reference is made to FIG. 4 in order to show the unique operation in forming a pair of furrows, and inverting soil strips removed from those furrows and throwing the soil strips in the opposite of the furrows. FIG. 4A illustrates a schematic view of a ground surface 10 in which no plowing has occurred. Thus, the ground surface may have stubble and growth on the upper surface thereof.

Figure 4A:
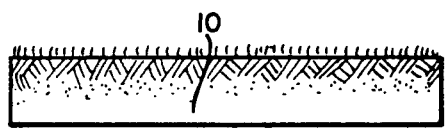
Figure 4B:
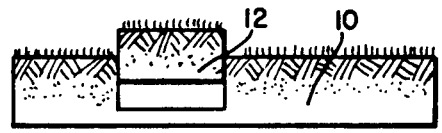
Figure 4C:
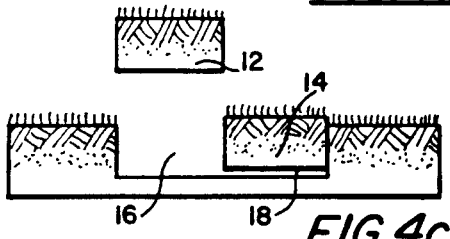
Figure 4D:
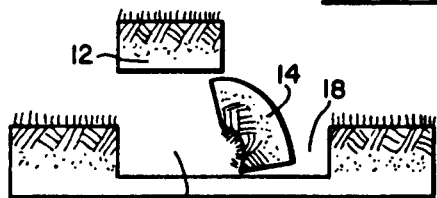

FIG. 4B illustrates a first soil strip 12 being removed from the ground surface 10 and which would have been cut from and elevated by a first moldboard plow. FIG. 4C illustrates an elevation of the first soil strip 12 and a simultaneous cutting of a second soil strip 14. The second soil strip 14 would be cut from the ground surface and rotated by the second moldboard. However, and in this case, it can be observed that the first soil strip 12 is elevated above the second soil strip 14.

It can be observed that when the first soil strip 12 is removed from the ground surface 10, a first furrow 16 is formed therein. In like manner, when the second soil strip 14 is removed from the ground surface 10 a second furrow 18 is formed therein. The shearing action which initially digs and separates the first and second soil strips from the ground occurs substantially simultaneously inasmuch as shares on the moldboard plow have their cutting o shearing edges simultaneously penetrated into the ground surface. However, by reference to FIG. 4, it can be observed that there is a sequential raising of the soil strips 12 and 14. The first soil strip 12 is raised as a next step after the shearing action. Thereafter, the second soil strip 14 is raised and rotated and also deposited in the first furrow 16 while the first soil strip 12 remains elevated. Thereafter, the second soil strip 12 is rotated and deposited into the second furrow 18. In essence, the various actions are occurring while the moldboard plow apparatus is moving in a forward direction although the steps shown functionally take place in sequential operation.

Figure 4E:
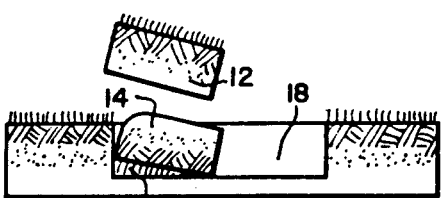
Figure 4F:
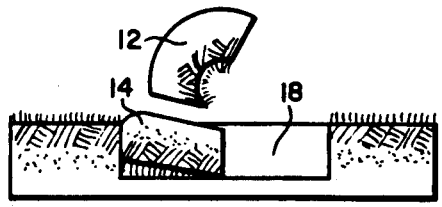

The soil strips 12 and 14 are also inverted by the moldboards. In this case, and by reference to FIG. 4D, it can be observed that the second soil strip 14 is being inverted. Moreover, as the second soil strip 14 is being inverted, there is an initial movement to throw this second soil strip 14 into the first furrow 16. FIG. 4E shows the second soil strip 14 being deposited into the first furrow 16 in the inverted position.

Figure 4G:
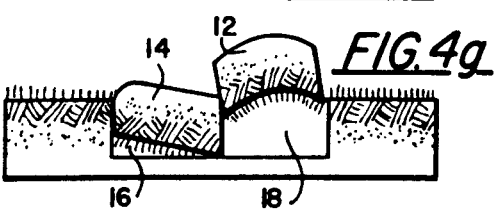
Figure 4H:
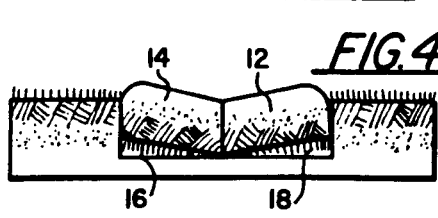

Simultaneously, with the depositing of the second soil strip 14 into the first furrow 16, it can be observed that there is a beginning movement in the inverting of the first soil strip 12. Moreover, by reference to FIG. 4F, it can be observed that the first soil strip 12 is partially inverted. Also, there is an initial movement to throw this first soil strip 12 into the second furrow 18. Referring now to FIG. 4G, it can be seen that the first soil strip 12 is fully inverted and is being deposited into the second furrow 18. FIG. 4H illustrates both soil strips 12 and 14 fully inverted and thrown into the opposite furrow from which they were removed.

FIG. 4A-4H shows a single trough defined by the furrows 16 and 18. However, in actual operation this single trough constitutes a pair of side-by-side furrows, that is first and second furrows which have a common side.

It can be observed, in accordance with the present invention, that the combined moldboard plow and the method utilized thereby is highly effective in sequentially removing a pair of soil strips from a ground surface. Moreover, the soil strips are inverted by the same moldboard plows used to remove the soil strips from the ground surface. In addition, the same moldboard plows are also effective to throw the soil strips removed from the ground surface into the opposite furrow. Each or these steps is uniquely accomplished by a pair of moldboard plows and each of which are provided with certain moldboard sections performing the various functions as described herein.

Referring now to FIGS. 1–3 which illustrate one of the preferred embodiments of the moldboard plow designated as "A", this plow A comprises a main frame 30 having a main generally rearwardly located transverse cross-bar 32. The frame 30 has a main hitching section 34 comprised of a pair of forward crossbars 36 and 38. A cross-bar or so-called "spacing bar" 37 forms part of the hitching section 34 and is located between lower hitch points 39. It can be seen that the hitching section is therefore somewhat triangular in shape in the embodiment as illustrated. Connected to the outer ends of the transversely extending forwardly located cross-bar 37 at the hitching point 39 are pairs of longitudinally arranged arms 40 for attaching or hitching the plow apparatus to tractor.

Connected between the forwardly located transversely extending cross-bar 37 and the main transverse cross-bar 32, in the manner as illustrated in FIGS. 1–3, are diagonally located braces 42. Also extending between the main transverse cross-bar 32 and the forwardly located transversely extending cross-bars 36 and 38 is a centrally located longitudinally extending main beam 44. In essence, the frame 30 adopts somewhat of a box-like construction at its rear portion and somewhat of a triangularly shaped construction at its forward end, as best illustrated in FIG. 2 and 3 of the drawings.

Rigidly mounted on the frame 30, and particularly carried by the main beam 44 and the main transverse cross-bar 32, is a centrally located upwardly extending, central plow support member 46 which supports extensions 54 and 56 of plane share 58. In the embodiment as illustrated, the plane share 58 has a forward pair of shares 48 and 50 which extend forwardly and outwardly and which have a common forward shearing edge 52, as best illustrated in FIGS. 1 and 2 of the drawings. Furthermore, by reference to FIG. 1 of the drawings, it can be observed that the plain share extensions 54 and 56 extend rearwardly and upwardly.

As indicated previously, the various steps, other than the initial shearing of the soil strips from the ground surface are functionally sequentially performed. Thus, and by reference to FIG. 4, it can be seen that the first soil strip would be deposited on the plane share extension 54 and the second soil strip 14 would be deposited on the plane share 84. The soil strip on the plane share extension 54 will be moved onto the moldboard plow 60 and will be raised as shown in FIG. 4C.

The second soil strip 14 will be initially located on the plane share section 84 and will thereupon be moved onto a surface of a moldboard 88. By reference to FIGS. 2 and 3 of the drawings, it can be observed that the plane share 58 actually defines a pair of plane share extensions 54 and 56 on opposite sides of the longitudinally extending main beam 44. This soil strip 14 will then be immediately deposited in the furrow 16 while the second soil strip 12 remains on the moldboard plow 60. Thereafter, the first soil strip 12 will be inverted and deposited into the second furrow 18. Each of these steps, will functionally take place in a sequential manner even though soil may be continuously moved along the plane share extensions and onto the moldboard surfaces of the respective plows.

It should be understood that so-called "shins" that is, vertically arranged plates on the sides of the share could operate in conjunction with the shares. Thus, the shares will perform the horizontal slicing action in the ground surface and the shins will perform the vertical slicing action in the ground surface and which thereby permits a complete separation of a soil strip from the ground surface.

As the moldboard plow A is pulled in a forwardly direction, that is to the right, reference being made to FIGS. 2 and 4, soil strips will be sheared from the ground surface and will be moved up to and accumulate on the plain share extensions 54 and 56. Thus, a pair of soil strips are removed such that a pair of furrows will be simultaneously formed. In the embodiment as illustrated, the two furrows may be side by side such that there is no soil strip therebetween. Nevertheless, inasmuch as two soil strips effectively have been removed from the ground surface, that is the soil strips on the plane share extensions 54 and 56, two individual furrows have been formed.

The plane share extensions 54 and 56 are each located forwardly of and introduce their payload, that is the soil strips, onto the moldboard surfaces of plows 60 and 62. The moldboard plows 60 and 62 each have first sections or lower sections 64 and 66, respectively, which are located to initially receive the soil strips from the respective plane share extensions 54 and 56. The soil strips are forced rearwardly and upwardly along the moldboard surfaces of the plows 60 and 62 as the moldboard plow apparatus A is pulled in a forwardly direction. The soil strips will thereupon reach second sections 68 and 70, respectively, which cause the soil strips to start to be inverted.

By reference to FIG. 2, it can be observed that each of the moldboard plows are curved outwardly such that the soil strips begin to be moved into an inverted position. Finally, each of the moldboards have respective third sections or outer sections 72 and 74 which cause the soil strips to be completely inverted and moreover cause the soil strips to be thrown from the moldboards 60 and 62.

In accordance with the above described construction, a soil strip removed from the ground surface and initially moved onto the plane share extension 56 will ultimately be moved onto the moldboard surface of the plow 62. In like manner, a soil strip removed from the ground surface and deposited on the plane share extension 54 will ultimately be moved onto the moldboard surface of the plow 60. As the soil strips are moved thereamong on the respective moldboard surfaces of the plows 60 and 62, they will both be inverted and thrown outwardly beyond the furrows from which they were removed.

Also carried by the main frame 30 of the moldboard plow apparatus A are a pair of outer plows 80 and 82. Each of the plows 80 and 82 have lower forwardly arranged shares 84 and 86 which lead into the moldboards 88 and 90. Thus, as the moldboard plow apparatus A is moved forwardly, soil strips will be moved onto the moldboard surfaces 88 and 90 causing formation of a pair of furrows. As this occurs, and as the moldboard plow apparatus A is continually moved in the forward direction, these soil strips will be moved upwardly on the respective plows 80 and 82.

The plows 80 and 82 also each have a forward and lower section 96 and 98 respectively. These forward sections 96 and 98 each receive the soil strips removed from the ground surface. Moreover, each of the plows 80 and 82 also have second sections 100 and 102 which start to invert the respective soil strips. Finally, each of the moldboards 90 and 92 have third rearwardmost sections 104 and 106, respectively, which completely invert and also throw the soil strips from the respective moldboard surfaces 88 and 90. In this case, and in the embodiment as illustrated, it can be observed that the soil strips on the plows 80 and 82 were removed from the ground surface thereby forming outermost furrows. Inasmuch as the flows 80 and 82 are arranged so that there are rearwardly located ends which extend inwardly, the soil strips will be thrown inwardly with respect to the furrows from which they were removed.

By further examining the actual construction of the apparatus of FIGS. 1-3 in terms of the schematic steps achieved by the apparatus in FIG. 5, it can be observed that four individual soil strips are removed from the ground surface. The two soil strips 134 and 136, as illustrated in FIG. 5, are simultaneously removed from the ground surface. Thereafter, and sequentially in function, the soil strips 126 and 128 are moved from the ground surface. The two innermost soil strips 134 and 136 are deposited on the plane shares 54 and 56 and thereby form a pair of inner furrows. The two outer soil strips 126 and 128 are deposited on the moldboard surfaces 88 and 90 and thereby form a pair of outer furrows. The soil strip on the moldboard surface 56 would thereby be inverted and deposited in the outer furrow from which the soil strip on the moldboard surface 90 was removed. In like manner, the soil strip on the moldboard surface 90 would be deposited in the furrow from which the soil strip on the moldboard surface 56 was removed. Further, the soil strip on the outer moldboard surface 88 would be inverted and deposited in the furrow formed by the removal of the soil strip on the moldboard surface 54. Finally, the soil strip on the moldboard surface 54 would be deposited in the furrow formed by removal of the soil strip on the moldboard surface 88.

The moldboard plows 60 and 62, as well as the outer moldboard plows 80 and 82, have each been described as being comprised of three sections. The three sections are integral with one another and form a fairly smooth continuous surface. Nevertheless, in terms of function, it can be perceived of each of the moldboards as having three individual sections. The first section serves to receive the soil strip from the associated share extension. The second section starts the inversion of the soil strip. The third section effectively completes the inversion of the soil strip and performs the dual function of throwing the soil strip from the moldboard.

It can also be seen that the preferred embodiment of the moldboard plow apparatus A comprises four individual plows, such as the plows 60 and 62 and the plows 80 and 82. In effect, this embodiment of the moldboard plow apparatus of the present invention is comprised of two pairs of moldboards. The moldboard plow 62 and the moldboard plow 82 operate and cooperate with one another and the moldboard plow 60 and the moldboard plow 80 cooperate with one another.

I accordance with the construction using two pairs of moldboard plows, the soil strip on the moldboard plow 60 is inverted and thrown into the furrow formed by removal of the soil strip on the moldboard plow 80. In like manner, the soil strip on the moldboard plow 80 is inverted and thrown into the furrow formed by the removal of the soil strip on the moldboard plow 60. Thus, these two individual moldboard plows can cooperate with one another in a single plow apparatus. In like manner, the two moldboard plows 62 and 82 function in the same way as the moldboard plows 60 and 80. Accordingly, the moldboard plows 62 and 82 could be located on a separate apparatus. Nevertheless, in the embodiment as illustrated, four individual soil strips can effectively be simultaneously removed and thrown into opposite furrows.

It can also be observed that the moldboard plows 60 and 62 are elevated above the associated moldboard plows 80 and 82. Thus, and by this elevation, it is possible to achieve the functions as illustrated in FIGS. 4A through 4H.

FIGS. 5A through 5F more specifically illustrate the method utilizing the embodiment of the moldboard plow illustrated in FIGS. 1 through 3. In this case, for example, FIGS. 5A through 5F show the simultaneous formation of two pairs of furrows with two individual pairs of soil strips.

Figure 5A:
Figure 5B:
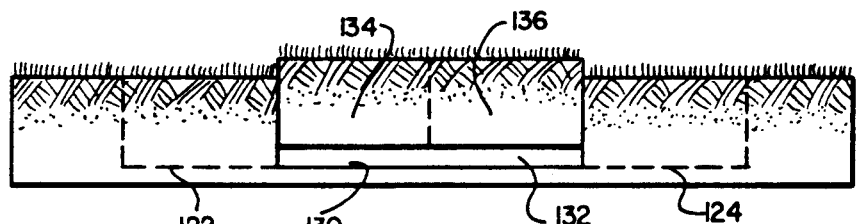

Referring now in more detail to FIG. 5A, it can be seen that there is a ground surface 120 which remains effectively unplowed and which includes stubble and other growth on the upper surface thereof. FIG. 5B illustrates in dotted lines, the outermost furrows 122 and 124 which would be formed by the respective moldboard plows 80 and 82. Thus, the furrow 122 would be formed when the soil strip 126 therein is disposed on the moldboard surface of the plow 82. The furrow 124 would be formed when the soil strip 128 therein is disposed on the outer moldboard surface of the plow 80.

FIG. 5B also shows the formation of a pair of abutted furrows 130 and 132. These respective furrows would be formed when a soil strip 134 is lifted onto the moldboard surface of the plow 62 and a soil strip 136 is lifted onto the moldboard surface of the plow 60. It can also be observed that the soil strips 134 and 126 are operative in cooperative pairs. Thus, the soil strip 134 would be deposited in the furrow 122 and the soil strip 126 would be deposited into the furrow 130. In like manner, the soil strip 128 would be deposited into the furrow 132 and the soil strip 136 would be deposited into the furrow 124.

Figure 5C:
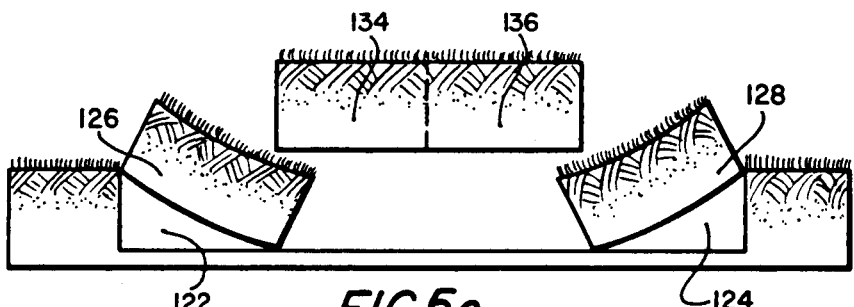
Figure 5D:
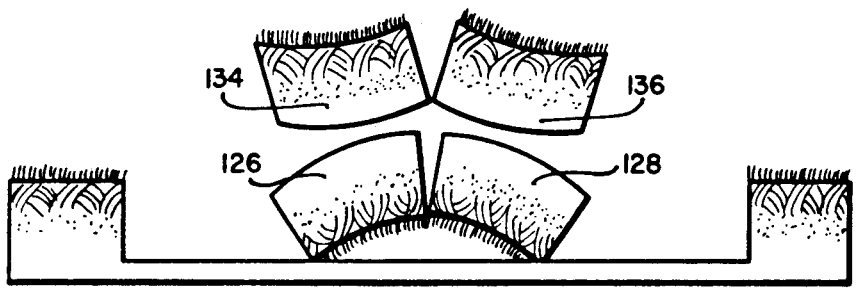
Figure 5E:
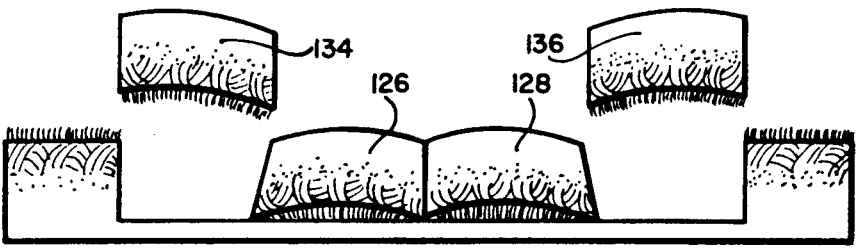
Figure 5F:
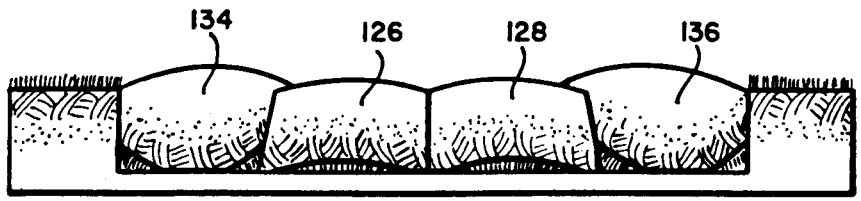

FIG. 5C illustrates the initial lifting of the two soil strips 134 and 136 out of the furrows 130 and 132 respectively. In like manner, FIG. 5C also shows the initial lifting of the soil strip 128 from the furrow 124 and the soil strip 126 from the furrow 122. FIG. 5D illustrates the inversion of the soil strips 126 and 128 and the depositing of these strips in the respective furrows 130 and 132. In like manner, FIG. 5E shows the inversion of the soil strips 134 and 136 and the depositing of these soil strips into the respective furrows 122 and 124. FIG. 5F illustrates the complete inversion and relocation of the soil strips such that the strip 134 is inverted and in the furrow 122, the soil strip 126 is inverted and in the furrow 130, the soil strip 128 is inverted and in the furrow 132 and the soil strip 136 is inverted and in the furrow 124.

Most conventional plow apparatus utilizing a pair of plows with associated moldboard surfaces have a tendency to move in opposite directions. That would normally occur in the apparatus of the present invention except for the fact that the apparatus effectively utilizes a pair of plow apparatus and each of which plow apparatus are provided with pairs of plows. The frictional forces are greater on the plow initially lifting the soil than on the other plow of the pair. However, by utilizing four individual plows as described herein, all frictional forces are essentially balanced.

FIGS. 6-8 more fully illustrate a slightly modified form of moldboard plow apparatus B constructed in accordance with and embodying the present invention. The moldboard plow apparatus B is similar to the previously described moldboard plow apparatus A illustrated and described in connection with FIGS. 1-5 except that this plow apparatus B includes a certain paddle wheel construction as hereinafter described. Reference numerals in FIGS. 6-8 which correspond to those in FIGS. 1-5 represent like elements which operate and co-act in the same manner as with the moldboard plow apparatus A.

Turning now to FIGS. 6-8, the moldboard plow apparatus B comprises a paddle wheel 140 which is rotatably mounted on a shaft 142 the latter being journalled within the lower ends of arm 144. The upper ends of the arms 144 are hingedly mounted on brackets 146 which are, in turn connected to the transverse cross-bar 32. The paddle wheel 140 includes a plurality of outwardly extending blades or so-called "paddles" 148 which are adapted to engage the soil strips and move the soil strips along a plane share 58 and also along the moldboard plows 60 and 62.

By reference to FIGS. 6 and 8 of the drawings, it can be observed that the paddle wheel 140 is vertically shiftable with respect to the soil strips on the plane share 46 by means of the hinged movement of the swingable arms 144. In this way, the paddle wheel 140 can raise and lower in order to accommodate the different heights of the dirt particles forming part of the soil strips on the plane share 58.

The paddle wheel may be powered for rotation by means of a motor 150. In a preferred embodiment of the invention, this motor 150 would adopt the form of a hydraulic motor. For this purpose, hydraulic lines 152 would be used for connecting to the hydraulic hoses on the tractor. In this way, the motor 150 can be powered by the hydraulic fluid which is used to operate other auxiliary equipment by the tractor.

The hydraulic motor 150 is physically mounted on one of the swingable arms 144 and is connected to the shaft 142 for purposes enabling rotation of the shaft 142 and hence of the paddle wheel 140.

The embodiment of the invention illustrated in FIGS. 6-8 is highly effective where the soil strip is very fluid and will not sustain the pressure required to force the soil strip up the plane share 58 without buckling and being forced off to the sides of the plane share 58.

Thus, there has been illustrated and described a unique and novel moldboard plow apparatus which enables a pair of soil strips to be simultaneous inverted and thrown into an opposite furrow. The moldboard plow apparatus thereby fulfills all of the objects and advantages which have been sought therefore. It should be understood that many changes, modifications, variations and other uses and applications will become apparent to those skilled in the art after considering this specification and the accompanying drawings. Therefore, any and all such changes, modifications variations, and other uses and application which do not depart from the spirit and scope of the invention are deemed to be covered by the invention.

Having thus described the invention, what I desire to claim and secure by letters patent is:

1. A moldboard plow apparatus for creating furrows and shifting a soil strip removed from one furrow to another and re-orienting the soil strip, said moldboard plow apparatus comprising:
   a) a first moldboard plow for removing a first soil strip from a ground surface and thereby forming a first furrow therein,
   b) a second moldboard plow for removing a second soil strip from a ground surface and thereby forming a second furrow therein,
   c) said first moldboard plow having a first moldboard surface with a section of the first moldboard surface which has a surface contour and orientation such that it causes the first soil strip to be introduced into said second furrow, and
   d) said second moldboard having a second moldboard surface with a section of the second moldboard surface which also has a surface contour and orientation such that it causes the second soil strip to be introduced into said first furrow.

2. The moldboard plow apparatus of claim 1 further characterized in that said section on said first moldboard surface of said first plow causes the first soil strip to be at least partially inverted and introduced into the second furrow and the section on the moldboard surface of said second plow causes the second soil strip to be at least partially inverted and introduced into the first furrow.

3. The moldboard plow apparatus of claim 2 further characterized in that said section on said first moldboard surface of said first plow has an elevated portion which raises the first soil strip above the second soil strip and retains the first soil strip in an elevated position while the second soil strip is being removed from the ground surface.

4. The moldboard plow apparatus of claim 3 further characterized in that said second soil strip is being deposited in said first furrow while said first soil strip is held in the elevated position.

5. The moldboard plow apparatus of claim 1 further characterized in that each said moldboard plow has a share with a forward shearing edge capable of digging into the ground to raise the soil strips as the moldboard plow apparatus is moved forwardly, and the forward shearing edge of the first moldboard plow is located forwardly of the forward shearing edge of the second moldboard plow.

6. The moldboard plow apparatus of claim 5 further characterized in that at least one of said moldboard plows has a another moldboard surface starting from he forward shearing edge and which curves generally continuously rearwardly from and with respect to the forward shearing edge and in the direction of the furrow formed by the other moldboard plow.

7. The moldboard plow apparatus of claim 5 further characterized in that the moldboard surface of said first moldboard plow also generally continuously increases in elevation rearwardly from the forward shearing edge of the first moldboard plow, and the second moldboard plow also generally continuously increases in elevation rearwardly from the forward shearing edge of the second moldboard plow.

8. The moldboard plow apparatus of claim 1 further characterized in that said moldboard plow apparatus comprises a first pair of first and second moldboard plows on one side of said plow apparatus for creating first and second furrows and a second pair of first and second moldboard plows on the other side of said plow for creating third and fourth furrows.

9. A moldboard plow apparatus for creating furrows and shifting soil strips removed from their respective furrows to other furrows and also re-orienting the soil strips, said moldboard plow apparatus comprising:
   a) a frame,
   b) a first moldboard plow mounted on said frame and being comprised of:
      1) a first forwardly projecting edge capable of digging into a ground surface to form first a furrow therein and lifting a first soil strip therefrom,
      2) a first moldboard surface extending rearwardly from said first forwardly projecting first edge and being curved generally continuously toward one lateral side of said frame from a point spaced rearwardly of said first forwardly projecting edge to a rear edge of said first moldboard surface,
      3) said first moldboard surface being continuously curved sufficiently toward said one lateral side so that a rear section of said first moldboard plow presents said first moldboard surface generally downwardly and to said one lateral side of said frame, so that the soil strip thereon may be at least partially inverted and deposited in a second furrow,
   c) a second moldboard plow mounted on said frame and being comprised of:
      1) a second forwardly projecting edge capable of digging into a ground surface to form said second furrow therein and lifting a second soil strip therefrom,
      2) a second moldboard surface extending rearwardly from said second forwardly projecting edge and being curved generally continuously toward an opposite lateral side of said frame from a point spaced rearwardly from said second forwardly projecting edge to a rear edge of said second moldboard plow, and
      3) said second moldboard surface being continuously curved sufficiently toward said opposite lateral side so that a rear section of said second moldboard surface presents said second moldboard surface generally downwardly and to said opposite lateral side of said frame so that the second soil strip thereon may be at least partially inverted and deposited in said first furrow.

10. The moldboard plow apparatus of claim 9 further characterized in that said first moldboard surface also inclines generally upwardly as it extends rearwardly from said first forwardly projecting edge and said second moldboard surface also inclines generally upwardly as it extends rearwardly from said second forwardly projecting edge.

11. The moldboard plow apparatus of claim 10 further characterized in that the rear section o said first moldboard plow is located rearwardly form the rear section of the second moldboard plow.

12. The moldboard plow apparatus of claim 11 further characterized in that the rear section of said first moldboard plow also extends laterally toward said one side of said frame so that the first soil strip is deposited in the second furrow, and said rear section of said second moldboard plow also extends laterally toward said opposite side of said frame so that the second soil strip is deposited in the first furrow.

13. A moldboard plow apparatus for creating furrows and removing soil strips from two furrows and re-orienting same and shifting the re-oriented soil strips to opposite furrows, said moldboard plow apparatus comprising:
   a) a first moldboard plow for removing a first soil strip from a ground surface and thereby forming a first furrow therein,
   b) a second moldboard plow for removing a second soil strip from the ground surface and thereby forming a second furrow therein,
   c) each of said moldboard plows having elongate surfaces extending from a single leading edge to a trailing edge of said respective moldboard plows, said elongate surface of said first moldboard plow receiving the first soil strip and causing the first soil strip to be introduced into the second furrow said elongate surface of said second moldboard plow receiving the second soil strip and causing the second soil strip to be introduced into the first furrow, and
   d) a rotatable paddle wheel located with respect to said elongate surfaces intermediate to the leading and trailing edges of said elongate surfaces to preclude stalling of the soil strips along the surfaces from the leading edges toward the trailing edges.

14. The moldboard plow apparatus of claim 13 further characterized in that said elongate surface of said first moldboard plow causes the first soil strip to be at least partially inverted and introduced into the second furrow and the elongate surface on the second moldboard plow causes the second soil strip to be at least partially inverted and introduced into the first furrow.

15. The moldboard plow apparatus of claim 14 further characterized in that said paddle wheel is powered for rotation by a motor means.

16. The moldboard plow apparatus of claim 13 further characterized in that said paddle wheel is powered for rotation by a motor.

17. A method for plowing a ground surface and simultaneously forming spaced apart first and second furrows and depositing the soil strips removed from the ground surface into the opposite one of the furrows, said method comprising:
 a) removing a first soil strip from a ground surface and thereby forming a first furrow therein,
 b) removing a second soil strip from the ground surface and thereby forming a second furrow therein,
 c) inverting the first soil strip,
 d) depositing the first soil strip in the second furrow,
 e) inverting the second soil strip, and
 f) depositing the second soil strip in the first furrow.

18. The method of claim 17 further characterized in that said step of inverting and depositing said first soil strip occurs approximately simultaneously, and said inverting and depositing said second soil strip occurs approximately simultaneously.

19. The method of claim 18 further characterized in that said second soil strips are sequentially inverted and deposited after the inversion and depositing of the first soil strips.

20. The method of claim 17 further characterized in that said method comprises elevating the first soil strip above the second soil trip simultaneously with the inverting of the first soil strip.

21. A method for plowing a ground surface of claim 17 further characterized in that the method comprises simultaneously reducing side board forces in a plow apparatus by forming a pair of spaced apart first furrows and a pair of spaced apart second furrows and depositing the soil strips removed from the ground surface into the opposite ones of the furrows from which they were removed comprising the steps of:
 a) removing a pair of first soil strips from a ground surface and thereby forming a pair of first furrows therein,
 b) removing a pair of second soil strips from the ground surface and thereby forming a pair of second furrows therein,
 c) inverting the first soil strips,
 d) depositing the first soil strips in the second furrows,
 e) inverting the second soil strips, and
 f) depositing the second soil strips in the first furrows.

* * * * *